United States Patent [19]

Schofield et al.

[11] Patent Number: 4,726,656
[45] Date of Patent: Feb. 23, 1988

[54] VEHICLE REARVIEW MIRROR ASSEMBLY CONTAINING A FLUID LIGHT CONTROLLING MEDIUM

[75] Inventors: Kenneth Schofield, Holland, Mich.; Keith W. Molyneux, Ballymore, Ireland

[73] Assignee: Donnelly Mirrors Limited, Naas, Ireland

[21] Appl. No.: 807,299

[22] Filed: Dec. 10, 1985

[30] Foreign Application Priority Data

Dec. 13, 1984 [IE] Ireland ............................. 3210/84

[51] Int. Cl.⁴ ........................ B60R 1/04; G02B 17/00
[52] U.S. Cl. ..................................... 350/278; 350/418
[58] Field of Search ................................ 350/278, 418

[56] References Cited

U.S. PATENT DOCUMENTS

| | | |
|---|---|---|
| 3,000,262 | 9/1961 | Rabinow et al. |
| 3,198,070 | 8/1965 | Platzer, Jr. et al. |
| 3,233,515 | 2/1966 | Platzer, Jr. et al. |
| 3,259,017 | 7/1966 | Faulhaber ............................. 88/77 |
| 4,054,374 | 10/1977 | Craig ..................................... 350/279 |

Primary Examiner—Bruce Y. Arnold
Assistant Examiner—Rebecca D. Gass
Attorney, Agent, or Firm—Price, Heneveld, Cooper, DeWitt & Litton

[57] ABSTRACT

A casing has a transparent window plate sealed therein. A reflector plate is mounted on a diaphram which forms a sealed chamber with the rearwall of the casing. The casing is mounted on a conventional mirror adjustment mechanism. A plurality of conical compression springs urge the reflector plate against the inside surface of the window plate in the day position of the reflector plate. To move the reflector plate from a day position to a night position, a pump draws an optically dense light attenuating fluid from a reservoir and pumps it into an annular chamber and between the window plate and reflector plate, to move the reflector plate rearwards so that the fluid forms a masking layer between the reflector plate and window plate. The masking layer extinguishes reflections from the reflector plate in the night position. A solenoid valve prevents return of the fluid to the reservoir in the night position.

30 Claims, 12 Drawing Figures

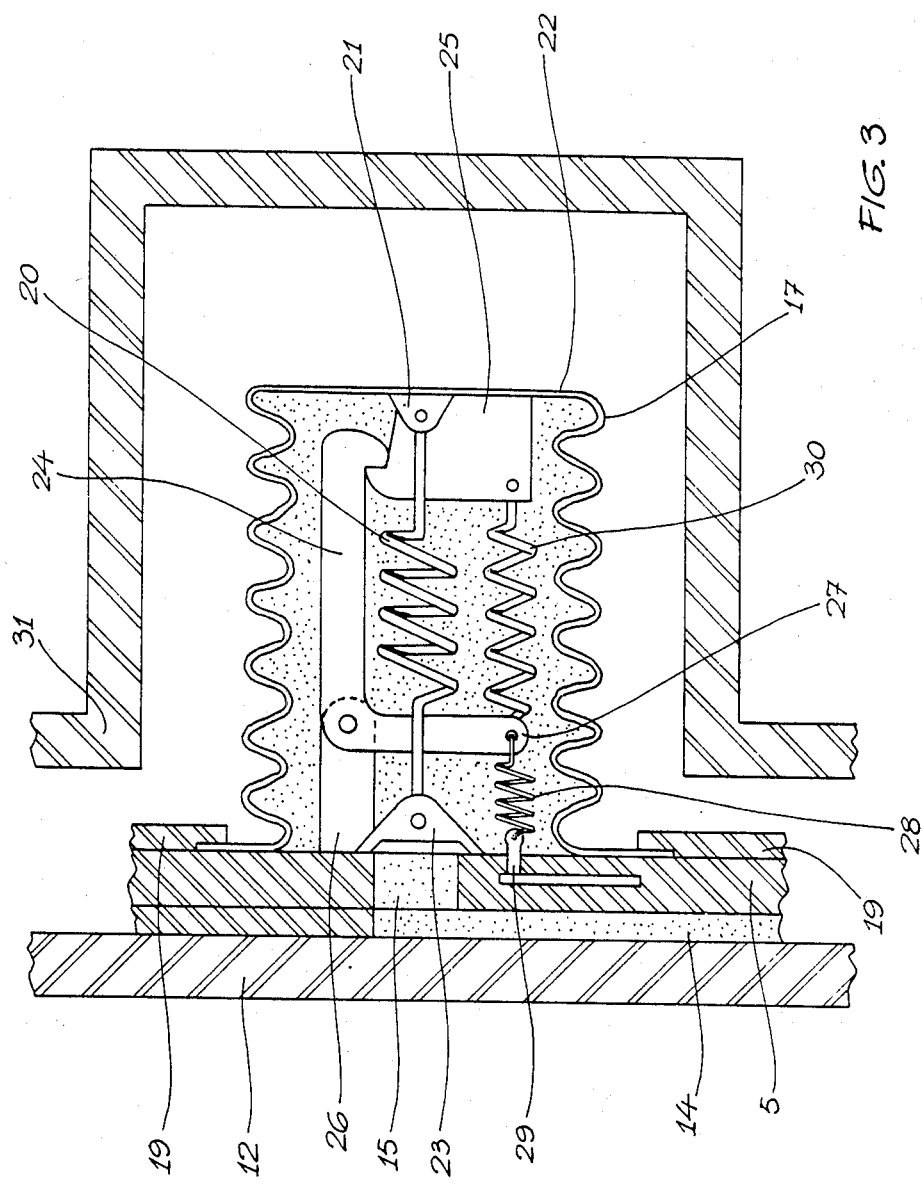

VEHICLE REARVIEW MIRROR ASSEMBLY CONTAINING A FLUID LIGHT CONTROLLING MEDIUM

This invention relates to a vehicle rearview mirror assembly of the type containing a fluid light controlling medium. More particularly, the invention relates to a vehicle rearview mirror of the day/night type, which utilizes an optically dense light attenuating fluid in the night position of the mirror, for preventing glare which is dangerous when driving at night and also to avoid multiple images.

Vehicle rearview mirrors of the above referred type are known and are described, for example, in U.S. Pat. Nos. 3,198,070 and 3,233,515. The above Specifications describe the rearward movement of a reflector or mirror, so that an optically dense light attenuating fluid is displaced from an adjacent reservoir, to the interface of a glass window and the mirror. Thus, a very thin film of the light attenuating fluid sandwiched at the interface for normal daylight conditions day mode is increased in thickness until adequate light attenuating properties are achieved for the night mode of the mirror. A problem with the vehicle rearview mirrors described in the above Specifications is that when the force is applied to the rear of the reflector to move the reflector rearwards, the reflector tends to form a shallow suction cup in which the periphery of the reflector acts to form a seal against the rear face of the window plate and thereby restrict the passage of fluid between the window plate and reflector plate. Also, in view of the suction cup effect, rearward movement of the reflector causes the pressure of the fluid behind the reflector to tend to increase and the pressure in front of the reflector to tend to decrease, and this has the effect of acting to prevent further rearward movement of the reflector and thus separation of the reflector plate and window plate.

A further problem with the vehicle rearview mirrors described in the above Specifications, is that they are complicated in construction, involving a multiplicity of parts which are difficult to assemble.

Thus, it is an object of the present invention to provide a vehicle rearview mirror of the day/night type, which utilizes an optically dense light attenuating fluid in the night position, and which is relatively simple in construction and which mitigates the above mentioned problems. A particular object of the invention is to provide a rear view mirror in which the movement of the reflector from the day to the night mode is faster and more efficient than in the prior art.

According to the invention there is provided a vehicle rearview mirror assembly comprising:

a casing having a substantially transparent window plate which forms a window to the casing and also forms a fluid seal with the casing, the window plate having an outer surface or relatively low light reflectivity, a reflector plate of relatively high light reflectivity disposed within the casing, the reflector plate confronting the inner surface of the window plate when the reflector plate is in a first (day) position in juxta-position with the window plate, and fluid control means for injecting an optically dense light attenuating fluid between the window plate and the reflector plate when the reflector plate is in the first (day) position, to move the reflector plate to a second (night) position within the casing spaced apart from the window plate, and wherein in the second (night) position the optically dense light attenuating fluid forms a masking layer between the window plate and the reflector plate to substantially extinguish light reflections by the reflector plate, the reflector plate being adapted to return to the first (day) position as the optically dense light attenuating fluid is removed from between the window plate and reflecting plate.

In one embodiment of the invention the fluid control means comprises, an electrically operated pump to pump the fluid from a reservoir of said fluid and inject it between the window plate and the reflector plate and maintaining the fluid under pressure between the window plate and the reflector plate.

Preferably, spring means is provided to urge the reflector plate from the second (night) position to the first (day) position when the pressure of fluid between the window plate and the reflector plate is released, the spring means in use acting to expel substantially all of the fluid from between the window plate and the reflector plate.

Further preferably, the reflector plate is mounted on a diaphram which forms a wall of a sealed fluid chamber, the fluid chamber forming a partial reservoir for the optically dense light attenuating fluid, and in use, the fluid is drawn out of the chamber causing a suction force in the chamber acting to separate the reflector plate and the window plate.

The spring means preferably comprises a plurality of conical compression springs, arranged in the fluid chamber to urge the reflector plate and the window plate together.

Preferably, the fluid is an optically dense light attenuating liquid, stable throughout the temperature range which the invention may be subject to, for example, −40° C. to 120° C. and having a viscosity compatible with free movement within the casing.

The casing is preferably located within a mirror housing which is open at the end adjacent the window plate and which forms a seal with the casing or the periphery of the outer face of the window plate.

The window plate is preferably a transparent glass plate. The reflecting plate is preferably a conventional glass mirror.

Embodiments of the invention will now be described, by way of example, with reference to the accompanying drawings, in which;

FIG. 1 is a cross-sectional view of a first embodiment of a vehicle rearward mirror assembly according to the invention showing the reflecting plate in a first (day) position, FIG. 2 is a cross-sectional view of the vehicle rearview mirror assembly of FIG. 1, showing the reflecting plate in a second (night) position, FIG. 3 is an enlarged cross-sectional view of the bellows unit shown in FIG. 1, FIG. 4 is a diagrammatic rear view of a second embodiment of the invention, FIG. 5 is a partial cross-sectional view of the casing in FIG. 4 along a line which corresponds with the line X—X indicated in FIG. 6, and showing the reflecting plate in a first (day) position, FIG. 6 is a perspective view of the inner rearwall and mirror shown in FIG. 5, but not showing the outer rearwall, FIG. 7 is a diagrammatic top plan view of a third embodiment of a mirror assembly according to the invention;

Figure 1:
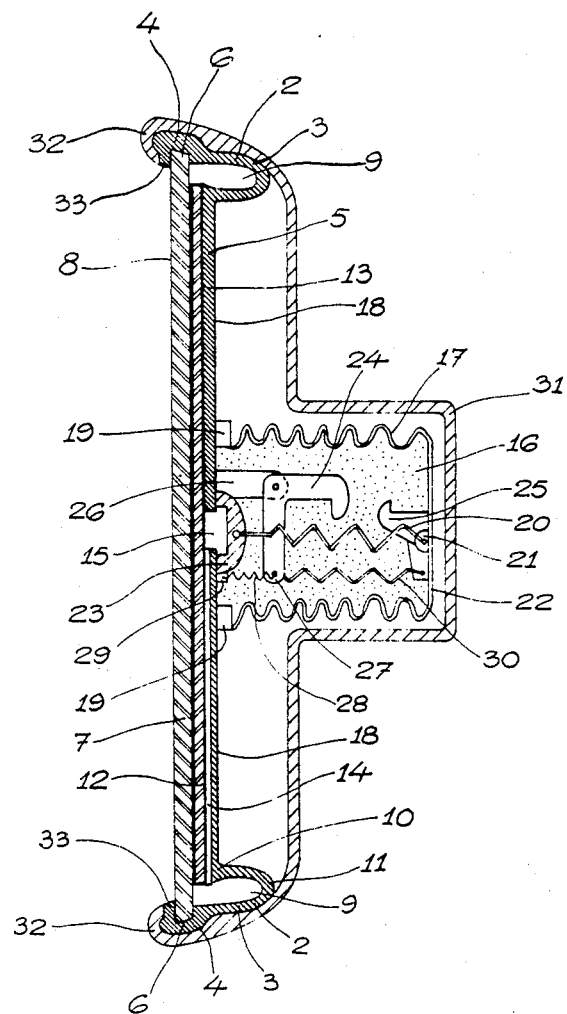
Figure 2:
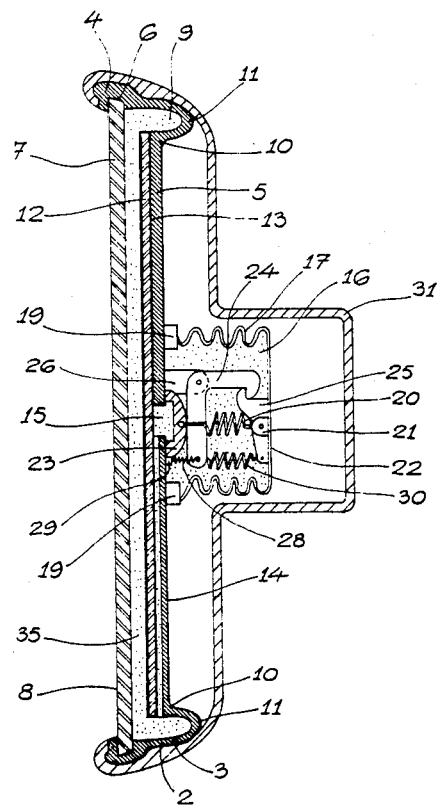

Referring now to the accompanying drawings wherein similar numerals have been used to indicate like parts, and referring in particular to FIGS. 1 to 3 there is shown therein, a first embodiment of a vehicle rearview mirror assembly according to the invention, which assembly is generally indicated at 1. There is provided a rectangular casing 2 formed of any suitable rubber or plastics material. The casing 2 includes a continuous sidewall 3, having a forward edge portion 4 and a flat rearwall 5 disposed rearwardly from the forward edge portion 4. The forward edge portion 4 has a continuous 'U' shaped annular recess 6, in which is located a transparent glass or plastics window plate 7 being of low light reflectivity. The outer face 8 of the window plate 7 will reflect approximately four percent (4%) of light incident on that face. The glass or PERSPEX window plate 7 forms a fluid seal with the 'U' shaped annular recess 6 of the casing 2. The casing 2 has an interior peripheral recess 9 defined between the margin 10 of the rearwall 5 and the continuous sidewall 3. The periphery 11 of the casing 2 in the region of the peripheral recess 9, is readily flexible permitting the rearwall 5 to be easily moved relative to the continuous sidewall 3.

A reflector or mirror plate 12 is mounted in any suitable manner on the interior surface 13 of the rearwall 5. The interior surface 13 of the rearwall 5 of the casing 2 includes a plurality of channels 14, (only one shown) which communicate with the interior peripheral recess 9. The channels 14, communicate with an aperture 15 in the rearwall 5, the aperture 15 communicating with a reservoir of a suitable optically dense light attenuating liquid 16. The reservoir comprises a bellows unit 17 mounted centrally on the exterior face 18 of the rearwall 5 of the casing 2. The bellows unit 17 can expand to its full extent in conventional manner as shown in FIG. 1. Further, the bellows unit 17 is liquid sealed to the exterior face 18 of the rearwall 5 of the casing 2 by means of a circular lug 19. Thus, the optically dense light attenuating liquid 16 is primarily contained within the bellows unit 17.

The bellows unit 17 includes a conventional first shape memory metal coil 20, one end of which is fixed to a bracket 21 secured to the free end 22 of the bellows unit 17. The other end of the shape memory coil 20 is secured to a bracket 23 mounted adjacent the aperture 15 in the rearwall 5 of the casing 2. Also, the bellows unit 17 incorporates a spring urges latch 24, which co-operates with a latch member 25 fixed to the free end 22 of the bellows unit 17. The latch 24 is pivotally mounted on a support 26 fixed to the rearwall 5 of the casing 2. One end 27 of the latch 24 is connected by a spring 28 to a support 29 secured in the rearwall 5 of the casing 2. The end 27 of the latch 24 is also connected by a second conventional shape memory metal coil 30 to the latch member 25.

The casing 2 and bellows unit 17 are located within a mirror housing 31 which is open at the front end 32 adjacent the window plate 7. The housing 31 compresses the forward edge portion 4 of the casing 2 in the region of the U shaped recess 6, so that the casing 2 forms a seal with the window plate 7.

The vehicle rearview mirror assembly 1, in use, is mounted in any suitable manner on or in a vehicle (not shown). Each of the shape memory metal coils, 20, 30 is connected in any suitable manner to a power supply (not shown) mounted within the vehicle.

Referring now in particular to FIG. 1, the reflector plate 12 is shown in a first (day) position in juxta-position with and abutting the inside face of the window plate 7. This first (day) position of the reflector plate 12, provides a relatively high degree of light reflectivity, since at most there is an extremely thin film of the optically dense light attenuating liquid 16, between the reflector plate 12 and the window plate 7, resulting in a high degree of light reflectivity as if the window plate 7 were not present.

In order to move the reflector plate 12 from the first (day) position shown in FIG. 1 to the second (night) position shown in FIG. 2, the shape memory metal coil 20 is heated above its transition temperature by passing an electrical current through it from the power supply (not shown), which causes the coil 20 to contract, thus compressing the bellows unit 17 to the position shown in FIG. 2. The electrical current from the power supply (not shown) may be switched on either manually or automatically. For example, during travel at night the electrical current may be switched on automatically by a signal supplied from photoelectric sensors mounted in or on the vehicle when the sensors detect a predetermined level of light intensity from the headlights of a following vehicle. Alternatively, the electrical current may be switched on by the driver of the vehicle manually operating a switch which may be conveniently positioned, for example, on the dashboard or steering wheel of the vehicle. The bellows unit 17 is maintained in the second (night) position of FIG. 2 by the latch member 25 engaging with the spring urged latch 24 as shown. As the bellows unit 17 compresses from the position of FIG. 1 to that of FIG. 2, the optically dense light attenuating liquid 16 is forced out of the bellows unit 17, through the aperture 15 in the rearwall 5, and through the channels 14 to the peripheral recess 9 of the casing 2, and is forced between the window plate 7 and the reflector plate 12 thus pushing the reflector plate 12 rearwards to a second (night) position within the casing 2 spaced from the window plate 7.

In this second (night) position, the window plate 7 provides a small amount of light reflectivity, and the optically dense light attenuating liquid 16, forms a masking layer 35 between the window plate 7 and the mirror 12, substantially extinguishing light reflections by the reflector plate 12. The amount of reflectivity of the rearview mirror assembly 1, in this second (night) position, is now reduced to approximately four percent (4%) since the major reflection now comes from the glass window plate 7.

In order to return the reflector plate 12 from the second (night) position to the first (day) position, the second shape memory metal coil 30 is energized in conventional manner either manually or automatically, which causes it to contract thus pivoting the latch 24 to release the latch member 25. Release of latch 24 enables bellows unit 17 to expand to its full extent again. As the bellows unit 17 expands, it creates a suction effect which causes the optically dense light attenuating fluid 16 forming the masking layer 35, to be drawn back through the recess 9, channels 14, and aperture 15 into the bellows unit 17, and also causes the mirror 12 to return to the position shown in FIG. 1. In practice, however, in the first (day) position of the reflector plate 12, the fluid 16 is contained mostly within the bellows unit 17, although a volume of the fluid will also be contained in the recess 9 and the channels 14. It will be apparent that the forces in the shape memory metal coils 20, 30, the latch spring 28, and the bellows unit 17, must be suitably arranged to enable smooth operation of the rearview mirror assembly 1.

It will be understood from the foregoing description that as the rearwall 5 moves from the first position to the second position and vice versa, the periphery 11 of the casing 2 is suitably flexible to accommodate this movement.

Figure 6:
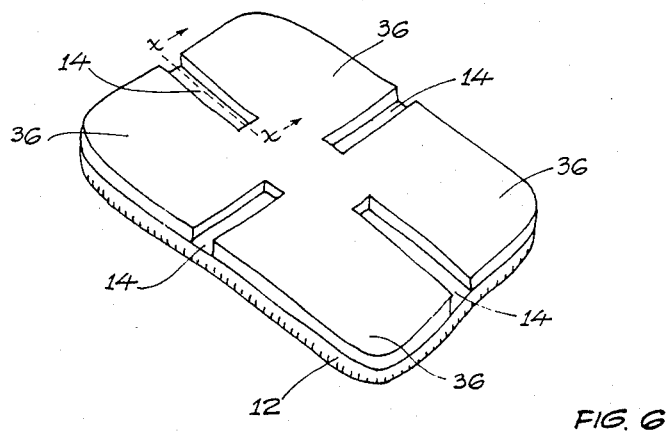
Figure 4:
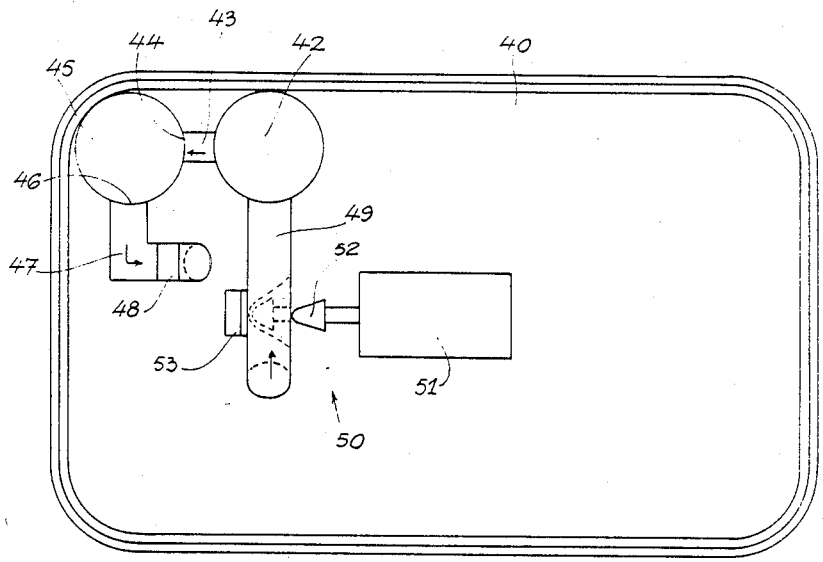
Figure 5:
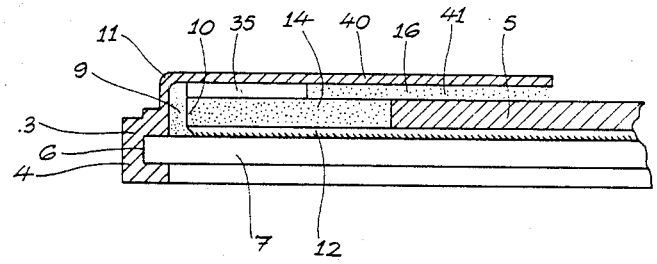

Referring now to FIGS. 4, 5 and 6 there is shown a second embodiment of the invention wherein similar numerals have been used to indicate like parts in the previous embodiment of the invention. The rearview mirror assembly 1, is formed having an inner rearwall 5 integral with an outer rearwall 40. The inner rearwall 5 defines a plurality of channels 14 (FIG. 6) which are in liquid communication with the interior peripheral recess 9 defined between the margin 10 of the rearwall 5 and the continuous sidewall 3. Defined between the inner and outer rearwalls 5, 40 respectively is a chamber 41, which is in liquid communication with the channels 14. The inner and outer rearwalls 5, 40 respectively are joined by integrally formed wall portions 35 in the regions 36 between adjacent pairs of channels 14. A flexible reservoir 42 for the optically dense light attenuating fluid 16 is mounted on the outer rearwall 40, of the casing and is connected via a conduit 43, to the inlet 44 of an electric pump 45 which is also mounted on the rearwall 40. The outlet 46 from the pump 45 is connected by a conduit 47, via a non return valve 48, through the outer rearwall 40 to the chamber 41. A conduit 49 of resilient material serves as an outlet from the chamber 41 back to the reservoir 42. Also mounted on the outer rearwall 40 is an electrically operated solenoid valve mechanisn 50, which comprises a solenoid 51 having an actuator arm 52 positioned opposite a stopper member 53 also mounted on the rearwall 40. The actuator arm 52 is shown in FIG. 4 in the "OFF" state of the solenoid 51. The solenoid 51 and pump 45 are both suitably connected to a power supply in the vehicle which may be actuated by the driver of the vehicle.

The reflector plate 12 as shown in FIG. 5 is in its first (day) position in juxta-position with and abutting the inside face of the window plate 7. To move the reflector plate 12 from the first (day) position shown in FIG. 5 to the second (night) position, the electric pump 45 and solenoid 51 are simultaneously switched on by the drive of the vehicle. This causes the actuator arm 52 to be moved to the left in FIG. 4, to the position shown in dotted outline, which squeezes the conduit 49 (as shown in dotted outline) against the stopper member 53 and closes off conduit 49, thus preventing any fluid 16 from being pumped out of the chamber 41. With the pump 45 switched on the optically dense light attenuating fluid 16 is pumped from the reservoir 42 through conduits 43 and 47 via the nonreturn valve 48, and into the chamber 41. The fluid 16 thus flows under pressure from the chamber 41 through the channels 14, into the peripheral recess 9 and is forced under pressure between the window plate 7 and the reflector plate 12, thus pushing the reflector plate 12 rearwards to the second (night) position within the casing 2. The reflector plate 12 is maintained in this position under the fluid pressure. The periphery 11 of the casing 2 in the region of the peripheral recess 9, is distorted and stretched as the reflector plate 12, moves to the second (night) position. The volume of optically dense attenuating fluid 16 in the casing 2 and reservoir 42, will of course be sufficient, to enable efficient movement of the reflector plate 12 from the day position to the night position. Furthermore, conventional electrical circuitry (not shown) is provided to switch off the pump 45 when the reflector plate 12 has moved from the first (day) position to the second (night) position. For example, a microswitch (not shown) may be provided which is activated when the reflector plate 12 has reached the second (night) position; the microswitch being connected to the pump 45 to switch off the pump when the microswitch is activated. Such an arrangement will be described in the following embodiments of the invention. Also, the circuitry will provide for the solenoid 51 to maintain the actuator member 52 in the position shown in dotted outline in FIG. 4, whilst the second (night) position of the reflector plate 12 is required, thus preventing any flow of the fluid 16 back to the reservoir 42.

In order to return the reflector plate 12 from the second (night) position to the first (day) position, it is only necessary for the driver of the vehicle to operate a switch and activate circuitry to de-energize the solenoid 51, thus causing the actuator member 52 to return to its inital position in which the conduit 49 is open. With the conduit 49 now open, the fluid pressure is released and the fluid flows back from the chamber 41 through the conduit 49 to the reservoir 42. The periphery 11 of the casing 2 in this embodiment of the invention, is sufficiently resilient (and in effect acts as a spring member) to force the reflector plate 12 back to its first (day) position and expel the fluid 16 from between the reflector plate 12 and the window plate 7. Any other suitable form of a resilient means, for example, spring(s) or a resilient diaphram, or suction means may be provided to force the reflector plate 12 when required, from its second (night) position, to its (first) day position, and expel the fluid 16 from between the reflector plate 12 and the window plate 7. Examples of alternative arrangements will be described in the following embodiments of the invention.

Figure 7:
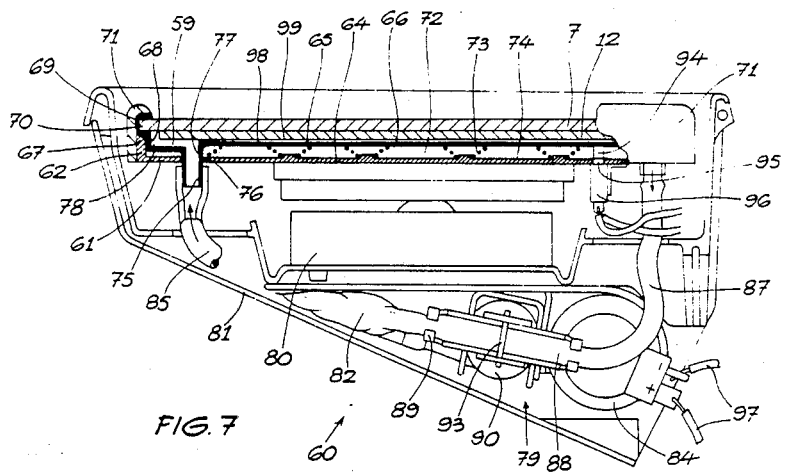
Figure 8:
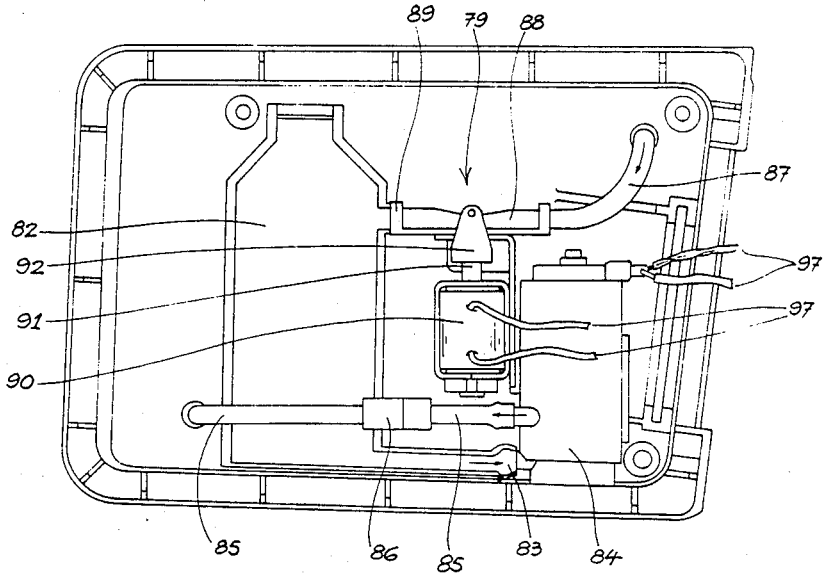
FIG. 8 is a rear view of the mirror assembly shown in FIG. 7.

Referring now to FIGS. 7 and 8 there is shown therein a third embodiment of the invention generally indicated at 60. In this construction, there is provided a substantially dish shaped casing 61 having a continuous rigid sidewall 62 formed integrally with a rigid base 64. A substantially dish shaped mirror support member 65 is mounted within the casing 61 and has a diaphram portion 66 on which is fixed in suitable manner a conventional reflector plate or mirror 12. The mirror support member 65 also has a continuous sidewall 68 which has a forward edge portion 69 having a continuous 'U' shaped annular recess 70 in which is located the transparent glass or plastics window 7. The window plate 7 forms a fluid seal with the forward edge portion 69 of the sidewall 68. The sidewall 62 of the casing 61 is enclosed within the bonded to a peripheral housing 71.

The forward edge portion 69 of the side wall 68 is sandwiched between the housing 71 and the end 67 of the sidewall 61 so that the forward edge portion effectively forms a fluid seal with the periphery of the window plate 7. A sealed fluid chamber 72 is defined between the base 64 and the diaphram 66. A plurality of conical compression springs 73 are located within the chamber 72, the springs 73 being seated in respective recesses 74 in the base 64. The springs 73 serve to bias the diaphram 66 and thus the reflector plate 12 to a first (day) position, as shown, with the reflector plate 12 confronting the inner surface of the window plate 7. The member 65 has formed therein an inlet conduit 75 which projects through an aperture 76 in the base 64. Further, the conduit 75 is integral with a flange portion 77 of the diaphram 66, the flange 77 defining a localized mouth or enclosure 59 which communicates with an annular chamber 78 which surrounds the chamber 72, the chamber 78 being in fluid communication with the inlet conduit 75 via the mouth 59. The casing 61 is secured in suitable manner to a conventional mirror orientation adjustment mechanism 80, which is in use controlled in known manner, either mechanically or electrically, by the driver of the vehicle to, or in which the mirror assembly 60 is fixed. The mechanism 80 is suitably mounted on a mirror housing 81.

A reservoir 82 of optically dense light attenuating fluid 16 is mounted within the housing 81. The reservoir 82 has an outlet conduit 83 connected to an electrically operated pump 84. The outlet from the pump 84 is connected to the conduit 75 on the diaphram 66 via a conduit 85 having a non-return valve 86. An outlet conduit 87 from the annular chamber 78 which is spaced from the inlet conduit 75 is connected to the reservoir 82. A solenoid operated valve generally indicated at 79 comprises a flexible portion 88 of the conduit 87 held in a bracket 89. A solenoid 90 having an actuator arm 91 is also mounted within the housing 81, the arm 91 having a 'U' shaped member 92 at its free end, the member 92 being positioned around the portion 88 of the conduit 87. The free ends of the member 92 have a rod 93 fixed therebetween. The diaphram 66 has formed therein a stud 94 which corresponds with an aperture 95 in the base 64. A microswitch 96 is mounted on the base 64 corresponding with the aperture 95, so that the microswitch 96 is activated when it is engaged by the stud 94 projecting through the aperture 95. The microswitch 96, pump 84 and solenoid 90 are connected by leads 97 to a suitable power supply and circuitry (not shown). A conventional heater (not shown) for heating the window plate 7 is mounted in the space 98 between the rear surface 99 of the reflector plate 12 and the diaphram 66. The heater is connected to a power supply (not shown) in the vehicle to which the assembly is fixed. The heater can be energised by the driver of the vehicle via a suitably positioned switch (not shown) to heat te window plate 7 to defrost the window plate 7. This is useful in winter for clearing frost and moisture from the outer surface of the window plate 7.

The reflector or mirror 12 is shown in FIG. 7 in its first (day) position with the reflector plate 12 in juxtaposition with and abutting the inside face of the window plate 7. The reflector plate 12 is maintained in this position by the conical springs 73. In order to move the reflector plate 12 from its day position to its night position, the driver of the vehicle activates a switch (not shown) to switch on the pump 84 and energize the solenoid 90 to close the valve 79. Once the solenoid 90 is energised, the arm 91 is pulled into the solenoid 90 so that the rod 93 compresses the conduit portion 88 against the bracket 89 effectively closing off the conduit 87. The pump 84 draws light attenuating fluid 16 from the reservoir 82 through the conduit 83 and pumps it along the conduit 85, via the nonreturn valve 86 and into the annular chamber 78 via the conduit 75 and mouth 59. The fluid 16 is then forced under pressure between the reflector plate 12 and window plate 7, thus forcing the mirror 12 rearwards to the second (night) position within the casing. As the reflector plate 12 and diaphram 66 are forced rearwards, the stud 94 projects through the aperture 95 in the rearwall 64 and when the night position has been attained the stud 94 activates the microswitch 96 which switches off the pump 84 via suitable electrical circuitry (not shown). Thus, the fluid is maintained under pressure and forms a masking layer between the window plate 7 and the reflector plate 12 substantially extinguishing light reflections by the reflector plate 12. When it is desired to return the reflector plate 12 to the day position the driver of the vehicle operates another or the same switch previously mentioned, which deenergises the solenoid 90 returning the actuator arm 91 to its original position, thus releasing the conduit portion 88. The coil springs 73 then serve to expel the light attenuating fluid from between the window plate 7 and the reflector plate 12 and return the reflector plate 12 to the day position with the fluid 16 returning to the reservoir 82 via the conduit 87.

Figure 9:
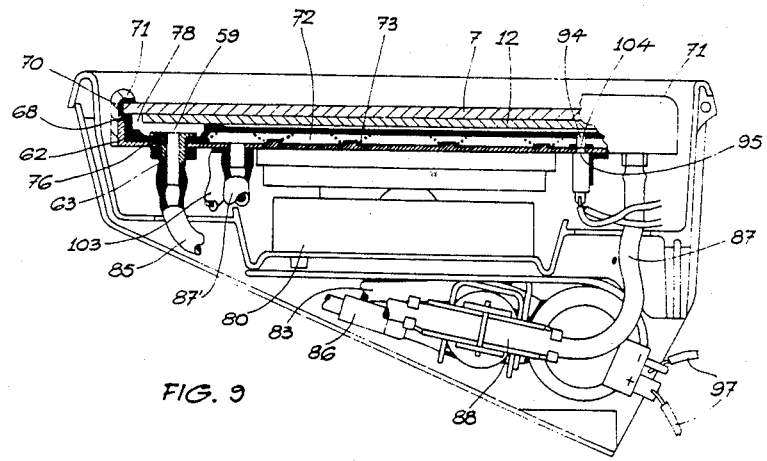
FIG. 9 is a diagrammatic top plan view of a fourth embodiment of a mirror assembly according to the invention.
Figure 10:
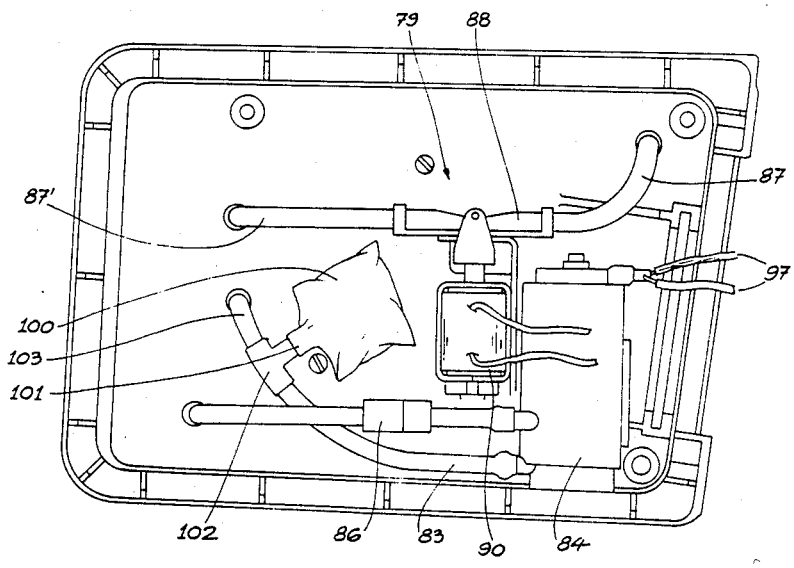
FIG. 10 is a rear view of the mirror assembly shown in FIG. 9.

In FIGS. 9 and 10 there is shown a fourth embodiment of the invention which is similar to the previous embodiment and thus only the differences will be described.

The main feature of this construction is that the optically dense light attenuating fluid 16 is contained within the chamber 72 which is a main reservoir as well as within a partial reservoir which in this case is an expandable container 100. The container 100 has an outlet 101 which is connected by means of a T piece conduit 102 to both the inlet conduit 83 to the pump 84 and to an outlet conduit 103 connected to the sealed fluid chamber 72. Further, the outlet conduit 87 from the annular chamber 78 provides an inlet 87' to the chamber 72 via the solenoid operated valve 79. The member 65 is sealed to the base 64 in the region of the aperture 76 and a nipple 63 fixed in the aperture 76 provides an inlet to the annular chamber 78. Thus, as shown in FIG. 9, the reflector plate 12 is in the first or day position in juxtaposition with and abutting the inside face of the window plate 7. The reflector plate 12 is biased in this position by means of the conical coil springs 73. To move the reflector plate 12 from the first (day) to the second (night) position the driver of the vehicle operates a switch (not shown) in the vehicle to switch on the pump 84 and energize the solenoid valve 79 to close the conduit portion 88. The pump 84 draws the fluid 16 from the container 100 via conduit 83, and also from the chamber 72 via the conduits 103 and 83. The fluid 16 is pumped into the annular chamber 78 via the nipple 63 and mouth 59 and is forced under presssure between the mirror 12 and the window plate 7, thus forcing the reflector plate 12 rearwards to the second (night) position. The fluid cannot return via the outlet conduit 87 to the chamber 72 as the conduit 88 is closed. Thus, in this embodiment, as fluid is removed from the chamber 72 a suction force is created within the chamber 72 which acts to pull the diaphram 66 and reflector plate 12 rearwards. Further, there is also the force of the fluid being injected between the window plate 7 and reflector plate 12 acting to push the reflector plate 12 rearwards. The pump 84 is switched off when the stud 94 activates the microswitch 96 as described for the previous embodiment. It will also be noted that in this construction to prevent leadkage of fluid from the chamber 72, the aperture 95 is sealed with a flexible membrane 104 which is distorted by the stud 94 when the night position is attained so that the microswitch 96 is activated. Also, in another embodiment it is envisaged that the microswitch may be located within the chamber 72. When it is desired to return the reflector plate 12 to the day position the solenoid 90 is deenergized enabling the fluid under pressure between the window plate 7 and reflector plate 12 to return via the conduit 87 and fill the chamber 72. As the pressure of fluid between the window plate 7 and reflector plate 12 is relieved the springs 73 act to force the diaphragm 66 and thus the reflector plate 12 towards the window plate 7. Thus, the fluid 16 is effectively expelled from the window/mirror interface. Also, as the springs 73 force the diaphragm 66 forwards returning the chamber 72 to its initial size, a suction force is created within the chamber 72 which is advantageous in drawing the fluid 16 back into the chamber 72. Since the container 100 is expandable, this permits the accommodation of changes in the fluid volume due to ambient temperature or pressure variations and substantially alleviates the possibility of leaks occurring in the fluid system or being caused by high fluid pressure. Furthermore, the reservoir 100 is in fact a reserve partial reservoir as the volume of fluid required to move the reflector plate 12 from its day to its night position is in practice stored within the chamber 72 and the various conduits. Thus, the reserve reservoir 100 provides an extra supply of fluid 16 which will be used in the system over a period of time as a small amount of fluid 16 may be lost through permeation in the fluid system.

Figure 11:
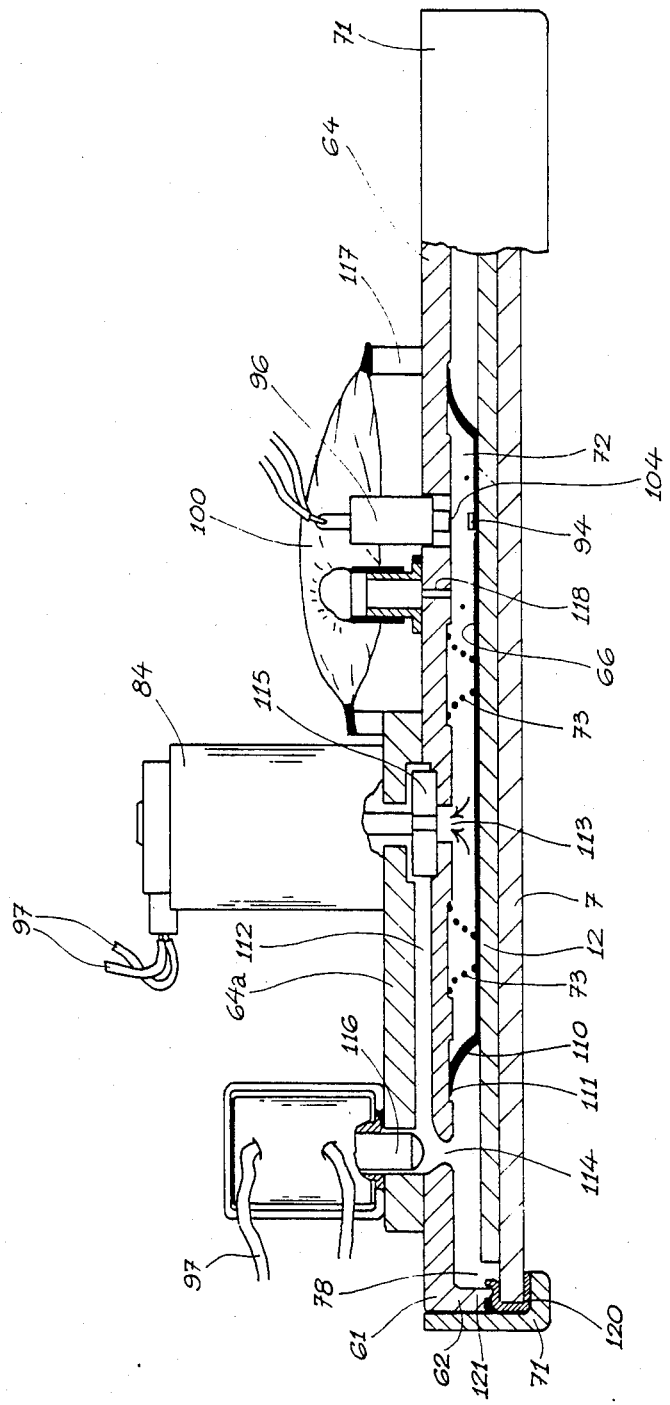
FIG. 11 is a diagrammatic top plan view of a fifth embodiment of a mirror assembly according to the invention.

In FIG. 11, there is shown a fifth embodiment of the invention. In this embodiment, the casing 61 has an inner base portion 64 and an outer base portion 64a. The reflector plate 12 is mounted on a diaphram 66 having a continuous resilient sidewall 110. The free end 111 of the sidewall 110 forms a fluid seal with the inside surface of the base member 64. The diaphragm 66 and reflector plate 12 are biassed into the day position of the reflector plate 12 by means of the coil springs 73 and also by the force exerted by the sidewall of the diaphram 66. A channel 112 is defined between the base members 64 and 64a. One end of the channel 112 communicates via an aperture 113 in the base member 64 with the chamber 72 defined by the diaphragm 66 and the base 64. A second aperture 114 in the base member 64 connects the other end of the channel with the annular chamber 78 which surrounds the diaphragm 66. A pump 84 is located on the base 64a with the impeller 115 of the pump 84 being located in the channel 112 adjacent the first aperture 113. A solenoid 90 is also mounted on the base 64a, the solenoid 90 having an actuator arm 116 arranged to close off the aperture 114 in the night position of the reflector plate 12. An expandable reservoir 100 of fluid 16 is provided mounted on studs 117 on the base members 64 and 64a, the reservoir 100 being connected to the chamber 72 via a restricted orifice 118 in the base member 64.

As shown in FIG. 11 the mirror 12 is in its first or day position in juxta-position with and abutting the inside face of the window plate 7. In order to move the reflector plate 12 from its day position to its night position the pump 84 is switched on to draw fluid 16 from the chamber 72 via the aperture 113 and force it along the channel 112 and into the annular chamber 78 via the aperture 114. The fluid 16 is thus forced under pressure into the reflector/window interface and forces the reflector plate 12 and diaphram 66 rearwards so that the fluid forms a masking layer between the window plate 7 and reflector plate 12. As the diaphram 66 is forced rearwards the continuous sidewall 110 distorts, however its free end 111 maintains a continuous fluid seal with the base 64. Further, as fluid 16 is removed from the chamber 72, the chamber is 72 replenished by fluid from the reservoir 100 via the restricted orifice 118. However, because of the restricted orifice 118 the fluid 16 is replenished in the chamber 72 at a lower rate than it is drawn off the by pump 84. Thus, a suction force is created in the chamber 72 which tends to draw the diaphram 66 and reflector plate 12 rearwards. Thus, as with the previous embodiment of the invention, there are in fact two forces acting to move the mirror from its day to its night position. When the reflector plate 12 has reached the night position the stud 94 activates the microswitch 96 which switches off the pump 84 and energises the solenoid 90 so that the actuator arm 116 of the solenoid moves outwards to seal the aperture 114 and prevent any return flow of fluid 16. Thus, in the night position the fluid is maintained under pressure in the annular chamber 78 and between the reflector plate 12 and window plate 7. To return the reflector plate 12 to the day position it is only necessary to deenergise the solenoid allowing the fluid to return to the chamber 72 via the channel 112. As the pressure of the fluid between the window plate 7 and reflector plate 12 is released the springs 73 force the diaphram 66 and the reflector plate 12 forward towards the window plate 7 and in doing so, the chamber 72 is expanded causing a suction force which helps to draw fluid back through the channel 112. An advantage of this embodiment of the invention is that the distance the fluid has to be moved is somewhat less than in previous embodiments of the invention and thus a smaller pump may be employed. Also, in FIG. 11 it will be noted that a separate annular seal 120, is provided around the periphery of the window 7, this seal being compressed on to the window plate 7 by the forward edge portion 121 of the sidewall 62 and the housing 71.

Figure 12:
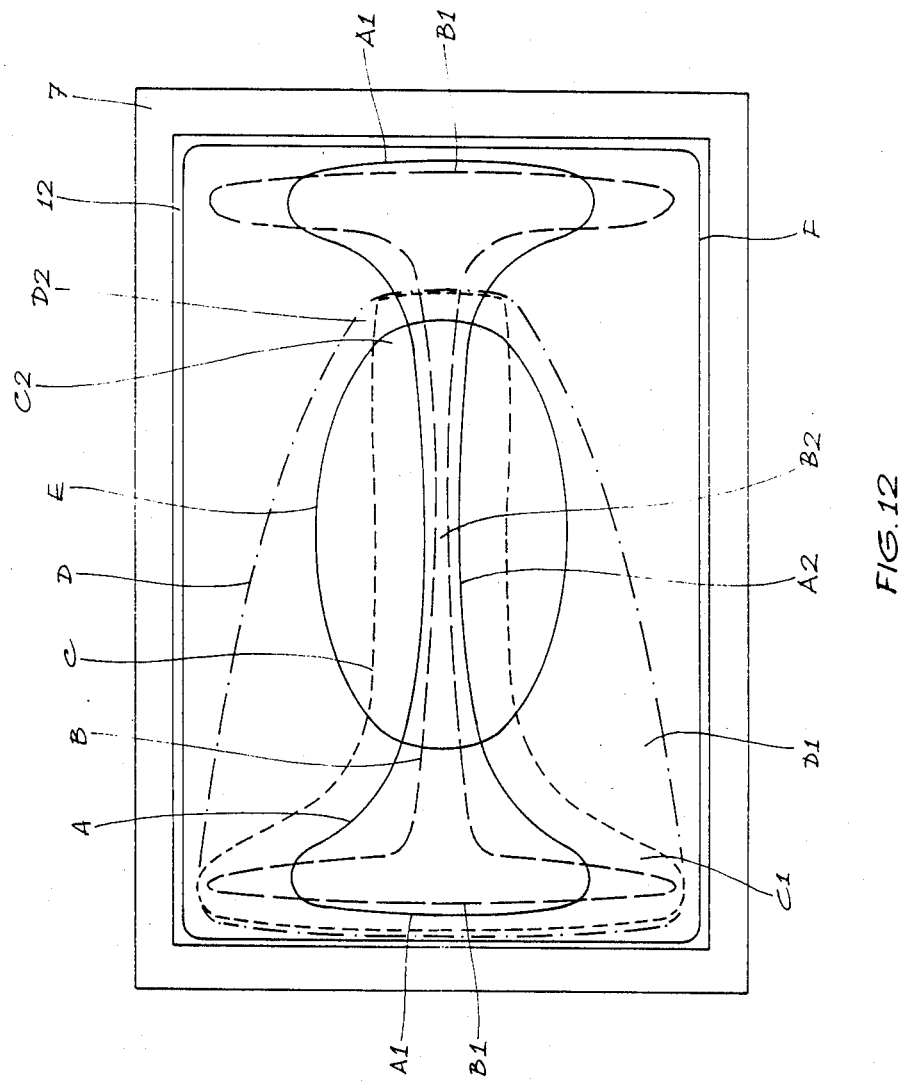
FIG. 12 illustrates a selection of shapes which the fluid reservoir may take in the fourth and fifth embodiments of the invention.

Although, in the embodiments shown in FIGS. 6 to 11, the chamber 72 may have any suitable shape, FIG. 12 illustrates some preferred shapes which the chamber may take. In particular, in the fourth and fifth embodiments shown in FIGS. 9 to 11, in which a suction force is created, the shape of the chamber 72 is of some importance. In FIG. 12 the shapes A, B, C and D have been found to be more suitable than the shape E. In the chamber shapes A and B, which are generally in the shape of a "barbell", up to approximately 50% of the total fluid 16 in the mirror assembly may be contained within the lobe rgions A1, and B1 respectively with a minimal amount of the total fluid being contained within the horizontal portions A2, B2 respectively. The horizontal portions should not however be so small as to restrict the fluid flow therein. Thus, when the pump 84 is operated to move the reflector plate 12 from the day to the night position and the fluid is drawn from the chamber 72, the suction effect created within the chamber 72 is greatest in the lobe regions A1, B1, and acts to separate the reflector plate 12 and window plate 7 in this region thus enabling the ready injection of fluid between the window plate 7 and reflector plate 12.

In the chamber shapes C and D there is a single lobe region C1, D1 respectively with elongate horizontal portions C2 and D2 respectively. Chamber C generaly is T-shaped. The lobe regions C1 and D1 in each case contain up to approximately 50% of the total fluid 16 in the assembly. In use, as the fluid is drawn from the chamber 72 by the pump 84, the suction effect within the chamber 72 is greatest in the region of the lobes and acts to initially separate the reflector plate 12 and window plate 7 in this region to permit the injection of the fluid 16. In general it is desirable if the suction force created is greatest adjacent to one edge of the reflector plate 12. The chamber 72 may also be of a generally rectangular shape as shown at F.

Some further properties of the embodiments of the invention which will in general be applied will now be described.

The known desirable optical properties of a fluid controlled day/night mirror assembly will be applied to the embodiments of the invention described herein and these properties are described in U.S. Pat. No. 3,198,070.

The fluid 16 will be matched to the materials which come into contact with the fluid so that loss of fluid be permeation through the materials is eliminated or minimised. Thus, the materials used will have a minimal, if any, permeability to the fluid.

It is envisaged that in practice the time period in moving the mirror from the day to the night mode of the mirror assembly will be of the order of a second. Also, in moving the mirror from the night to the day mode, it is envisaged that an increase in reflectance of approximately 50% can be achieved within 1-2 seconds and maximum reflectance of up to 70-90% can be achieved within a few minutes as the fluid 16 is gradually expelled from between the window and reflector plates.

It will also be understood that the assembly is suitably constructed that in the event of failure of the components of the mirror assembly, the reflector plate 7 will return to, or remain in the first or (day) position.

If desired, spacers known in the art may be used to determine a minimum spacing between the window and mirror when the assembly is in the day position. Such spacers are described in U.S. Pat. No. 3,198,070.

It will be understood that any suitable driver mechanism may be employed for forcing the optically dense light attenuating fluid under pressure between the window and reflector plate.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are as follows:

1. A vehicle rearview mirror assembly comprising:
   a casing having a substantially transparent window plate which forms a window to the casing and also forms a fluid seal with the casing, the window plate having an outer surface of relatively low light reflectivity,
   a reflector plate of relatively high light reflectivity disposed within the casing, the reflector plate confronting the inner surface of the window plate when the reflector plate is in a first (day) position in juxta-position with the window plate,
   and fluid control means for injecting an optically dense light attenutating fluid between said window plate and said reflector plate when said relfector plate is in said first (day) position, to move said reflector plate to a second (night) position within the casing spaced apart from said window plate,
   and wherein in said second (night) position the optically dense light attenuating fluid forms a masking layer between said window plate and said reflector plate to substantially extinguish light reflections by said reflector plate,
   said reflector plate being adapted to return to said first (day) position as the optically dense light attenuating fluid is removed from between said window plate and reflecting plate;
   said fluid control means including a fluid chamber for holding a quantity of the light attenuating fluid, an electrically operated pump for pumping the fluid from said fluid chamber and injecting it between said window plate and said reflector plate, and control means for maintaining the fluid under pressure between the window plate and the reflector plate to maintain said reflector plate in said second position.

2. A vehicle rearview mirror assembly as claimed in claim 1, wherein spring means is provided to urge the reflector plate from the second (night) position to the first (day) position, when the pressure of fluid between the window plate and the reflector plate is released with said control means, the spring means, in use, acting to expel substantially all of the fluid from between the window plate and the reflector plate.

3. A vehicle rearview mirror assembly as claimed in claim 2, wherein the reflector plate is mounted on a diaphram, the diaphram together with a base of the casing defining a sealed fluid chamber, the spring means comprising a plurality of conical compression springs being seated on the base of the casing and within the sealed fluid chamber, and acting to urge the diaphram and reflector plate towards the window plate.

4. A vehicle rearview mirror assembly as claimed in claim 3, wherein the sealed fluid chamber forms the main reservoir for the fluid, the main reservoir being in communication with a partial reservoir, and wherein, in the first (day) position of the reflector plate and on operation of the pump, fluid is drawn via an outlet conduit from the sealed fluid chamber causing a suction effect on the diaphram acting to move the diaphram and the reflector plate away from the window plate, the fluid being pumped into an annular chamber around the periphery of the reflector plate and window plate interface and injected between the window plate and reflector plate.

5. A vehicle rearview mirror assembly as claimed in claim 4, wherein the sealed fluid chamber has an inlet conduit connected to an outlet conduit from the annular chamber, such that in use, in the second (night) position of the reflector plate and on relieving the pressure of the fluid between the window plate and reflector plates with said control means, the fluid returns to the sealed fluid chamber partially under a suction force created in the sealed fluid chamber as the chamber expands.

6. A vehicle rearview mirror assembly as claimed in claim 5, wherein said control means include valve means for closing the outlet conduit from the annular chamber.

7. A vehicle rearview mirror assembly according to claim 4, wherein the sealed fluid chamber communicates with the partial reservoir via a restricted orifice in the base of the casing, the outlet conduit from the sealed fluid chamber being of greater cross-section thant the restricted orifice, such that in use, the flow of fluid out of the sealed fluid chamber via the pump is greater than the flow of fluid into the sealed fluid chamber to cause a suction force in the chamber which acts to separate the reflector plate and window plate.

8. A vehicle rearview mirror assembly according to claim 4, wherein the partial reservoir is flexible to accommodate changes in the fluid volume in the assembly, as a result of ambient pressure and/or temperature changes or loss of fluid through permeation in the assembly.

9. A vehicle rearview mirror assembly according to claim 1, in which a switching means is provided to switch off the pump when the reflector plate is moved to the second (night) position.

10. A vehicle rearview mirror assembly as claimed in claim 1, wherein the fluid is an optically dense light attenuating liquid.

11. The vehicle rearview mirror assembly of claim 1 including suction means for pulling said reflector plate away from said window plate during operation of said pump.

12. The vehicle rearview mirror assembly of claim 11 wherein said suction means includes said fluid chamber which is sealed and positioned behind said reflector plate, said chamber having a flexible diaphragm on which said reflector plate is mounted and a base on said casing, and a fluid conduit extending between said sealed fluid chamber and said casing; said control means including valve means for opening and closing said fluid conduit whereby a suction force is created when said valve means is closed and said pump is operated to draw fluid from said sealed fluid chamber for insertion into said casing between said reflector plate and window plate.

13. The vehicle rearview mirror assembly of claim 11 wherein said suction means includes said fluid chamber which is sealed and positioned behind said reflector plate, said sealed fluid chamber including at least one lobe portion adjacent an edge of said reflector plate, said lobe creating a suction force which aids injection of the fluid between said reflector plate and window.

14. The vehicle rearview mirror assembly of claim 13 wherein said sealed fluid chamber is elongated, said lobe including an enlarged end of said elongated chamber.

15. The vehicle rearview mirror assembly of claim 14 wherein said sealed fluid chamber is generally T-shaped with the cross of the T extending along an edge of said reflector plate.

16. The vehicle rearview mirror assembly of claim 13 wherein said sealed fluid chamber has the shape of a barbell with the enlarged ends of the chamber extending along opposite edges of said reflector plate.

17. The vehicle rearview mirror assembly of claim 13 wherein said sealed fluid chamber is rectangular in shape.

18. The vehicle rearview mirror assembly of claim 13 wherein said lobe portion contains approximately 50% of any fluid in said sealed fluid chamber.

19. The vehicle rearview mirror assembly of claim 1 wherein said fluid chamber includes a main reservoir for the fluid; a first fluid conduit connecting said casing to said main reservoir; and a second fluid conduit also connecting said casing to said main reservoir, said pump connected in said second fluid conduit.

20. The vehicle rearview mirror assembly of claim 19 wherein said control means includes valve means in said first fluid conduit for opening and closing said first fluid conduit to prevent return of the fluid to said main reservoir when said reflector plate is in said second (night) position.

21. The vehicle rearview mirror assembly of claim 19 including a partial reservoir connected in fluid communication with said second fluid conduit, said partial reservoir being expandable to accommodate changes in volume of the fluid.

22. The vehicle rearview mirror assembly of claim 1 including a fluid conduit connecting said fluid chamber with said casing; said pump including an impeller for pumping the fluid out of said fluid chamber, through said fluid conduit and into said casing; said control means including valve means in said fluid conduit for opening and closing said conduit to prevent return of the fluid to said fluid chamber when said reflector plate is in said second (night) position.

23. The vehicle rearview mirror assembly of claim 22 including a partial reservoir in fluid communication with said fluid chamber, said partial reservoir being expandable to accommodate changes in volume of the fluid.

24. The vehicle rearview mirror assembly of claim 23 wherein said fluid chamber includes a flexible diaphragm on which said reflector plate is mounted and a rigid base on said casing.

25. In a vehicle rearview mirror assembly of the day/night type containing a fluid light controlling medium, the method of changing the mirror assembly from the day mode to the night mode comprising the step of;
pumping an optically dense light attenuating fluid from a sealed chamber for the fluid in said assembly between a window plate and a reflector plate when the reflector plate is in a first (day) position, to move the reflector plate to a second (night) position spaced from said window plate, such that the optically dense light attenuating fluid forms a masking layer between the window plate and reflector plate to substantially extinguish light reflections by the reflector plate while subjecting the reflector plate to a suction force to aid in moving the reflector to the night position, said suction force being created by the transfer of the fluid under the influence of the pump from the sealed fluid chamber to the region of the reflector plate and window plate interface.

26. The method of claim 25 including changing the mirror assembly from the night mode back to the day mode by creating a second suction force in the sealed fluid chamber spaced from the window plate to help draw and remove the fluid from between the window plate and reflector plate.

27. The method of claim 26 wherein said second suction force is created by opening a fluid passage allowing fluid to flow from between the reflector plate and window plate and urging the reflector plate toward the window plate with a biasing means.

28. A vehicle rearview mirror assembly comprising:
a casing including a substantially transparent window having an outer surface of relatively low light reflectivity which forms a window to the casing; said casing including means forming a fluid seal around the perimeter of said window and a relatively flexible diaphragm;

a reflector of relatively high light reflectivity mounted on said diaphragm of said casing, said reflector movable with said diaphragm between a first position in which said reflector engages the inner surface of said window and a second position in which said reflector is spaced from said inner surface of said window by a layer of optically dense light attenuating fluid forming a masking layer to substantially extinguish light reflections by said reflector;

electrically operated pump means for injecting the optically dense light attenuating fluid under pressure within said casing between said window and reflector to move said reflector from said first position to said second position;

biasing means for returning said reflector to said first position when the pressure of said fluid between said window and reflector is released; and suction means for pulling said reflector away from said window during operation of said pump means.

29. The assembly of claim 28 including a sealed fluid chamber formed between said diaphragm and a rigid portion of said casing behind said reflector; a fluid conduit extending between said sealed chamber and said casing; and valve means for opening and closing said fluid conduit.

30. The assembly of claim 29 including switch means for deactivating said pump means when said reflector reaches said second position.

* * * * *

UNITED STATES PATENT AND TRADEMARK OFFICE
CERTIFICATE OF CORRECTION

PATENT NO. : 4,726,656

DATED : February 23, 1988

INVENTOR(S) : Kenneth Schofield and Keith Winston Molyneux

It is certified that error appears in the above-identified patent and that said Letters Patent is hereby corrected as shown below:

Column 3, line 63:

"urges" should be --urged--.

Column 6, line 68:

"the" should be --and--.

Column 7, line 56:

"te" should be --the--.

Column 9, line 6:

"leadkage" should be --leakage--.

Column 10, line 17:

"the by pump 84" should be --by the pump 84--.

Column 10, line 59:

"rgions" should be --regions--.

Column 11, line 26:

"be" should be --by--.

Column 11, line 48:

"driver" should be --drive--.

UNITED STATES PATENT AND TRADEMARK OFFICE
CERTIFICATE OF CORRECTION

PATENT NO. : 4,726,656

DATED : February 23, 1988

INVENTOR(S) : Kenneth Schofield and Keith Winston Molyneux

It is certified that error appears in the above-identified patent and that said Letters Patent is hereby corrected as shown below:

Column 12, claim 1, line 6:

"relfector" should be --reflector--.

Column 13, claim 7, line 7:

"thant" should be --than--.

Signed and Sealed this

Fourth Day of October, 1988

Attest:

DONALD J. QUIGG

Attesting Officer

Commissioner of Patents and Trademarks